INVENTORS
Kenneth W. Heizer &
Virgil A. Hinds
BY Stevens, Davis, Miller & Mosher
ATTORNEYS INVENTORS
Kenneth W. Heizer &
Virgil A. Hinds
BY Stevens, Davis, Miller & Mosher
ATTORNEYS INVENTORS
Kenneth W. Heizer &
Virgil A. Hinds
BY Stevens, Davis, Miller & Mosher
ATTORNEYS INVENTORS
Kenneth W. Heizer &
Virgil A. Hinds
BY Stevens, Davis, Miller & Mosher
ATTORNEYS United States Patent Office 3,246,296

Patented Apr. 12, 1966

3,246,296

CHARACTER READING APPARATUS

Kenneth W. Heizer, Champaign, Ill., and Virgil A. Hinds, Dallas, Tex., assignors to Sperry Rand Corporation, New York, N.Y., a corporation of Delaware Filed May 3, 1961, Ser. No. 107,488
14 Claims. (Cl. 340—146.3)

The present invention relates to apparatus for identifying intelligence bearing characters and more specifically, to apparatus for receiving signals from character scanning means and processing and interpreting said scanning signals to provide output signals indicative of the characters scanned, said output signals being capable of actuating various output devices such as electric typewriters, tape punching machines, card punching machines or other devices capable of receiving information.

A number of devices for recognizing printed characters are presently known in the art. These devices may be broadly grouped into two types; those in which recognition is based on fundamental stroke differences and the occurrence of absence of open or closed loops and those types in which recognition is based on the printed or unprinted condition of a character in a plurality of selected discrete areas or sampling spots. Although the former type is, generally speaking, more flexible in application (that is, characters of more than a single font or size of type or of somewhat less than perfect formation may be recognized), the latter type is characterized by less complex (and, hence, less costly) circuitry. Aside from the limitation of being able to work in connection with only a single font and size of type, the principal disadvantages of this latter type of reading apparatus are the rather stringent requirements placed on the registration of the characters to be read in relation to the area scanned by the scanning device and on the quality of the printing impression forming said characters.

The present invention, through retaining the relative simplicity characteristic of reading apparatus which make use of a spot sampling technique of recognition, has to a large extent eliminated the limitations placed on the applications of these devices by critical requirements concerning the registration and impression quality of the printed characters to be read.

Therefore, it is a principal object of this invention to provide apparatus of the type referred to generally above for the reading of intelligence bearing characters.

It is a further object of this invention to provide apparatus for the recognition of characters independent of critical registration or alignment requirements of the character to be read.

It is a still further object of this invention to provide apparatus for the recognition of printed characters even though said characters be smudged or otherwise of less than perfect formation.

It is a still further object of the present invention to provide a system for character recognition in which problems of mis-registration both horizontal and vertical are largely eliminated.

It is another object of the present invention to provide such a system which provides a digital signal resulting from the scanning of a character and decodes this digital signal in a manner designed for accurate identification of the scanned character.

It is another object of the present invention to provide such a system in which the character to be identified is scanned to provide a multibit digital signal characteristic of the scanned character and in which means are provided to decode this digital signal in a manner to accurately identify the scanned character.

It is a further object of the present invention to provide such a system in which the decoding means includes a means such as a shift register to store the digital signal generated by the scan and the contents of this shift register is periodically decoded to provide a plurality of output signals, one of which is distinguished from the others to thereby identify the scanned character.

Other and further objects and advantageous features will be recognized in the following detailed description of a preferred embodiments of the invention when considered with the accompanying drawings in which.

Figure 3:
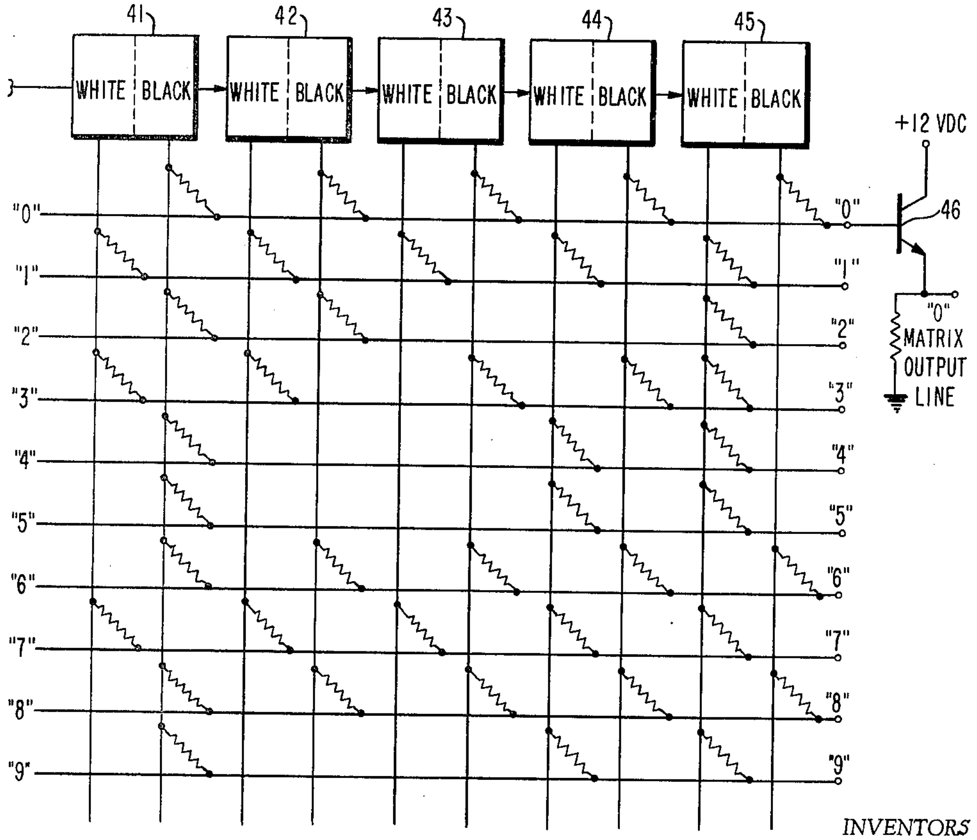
Figure 4:
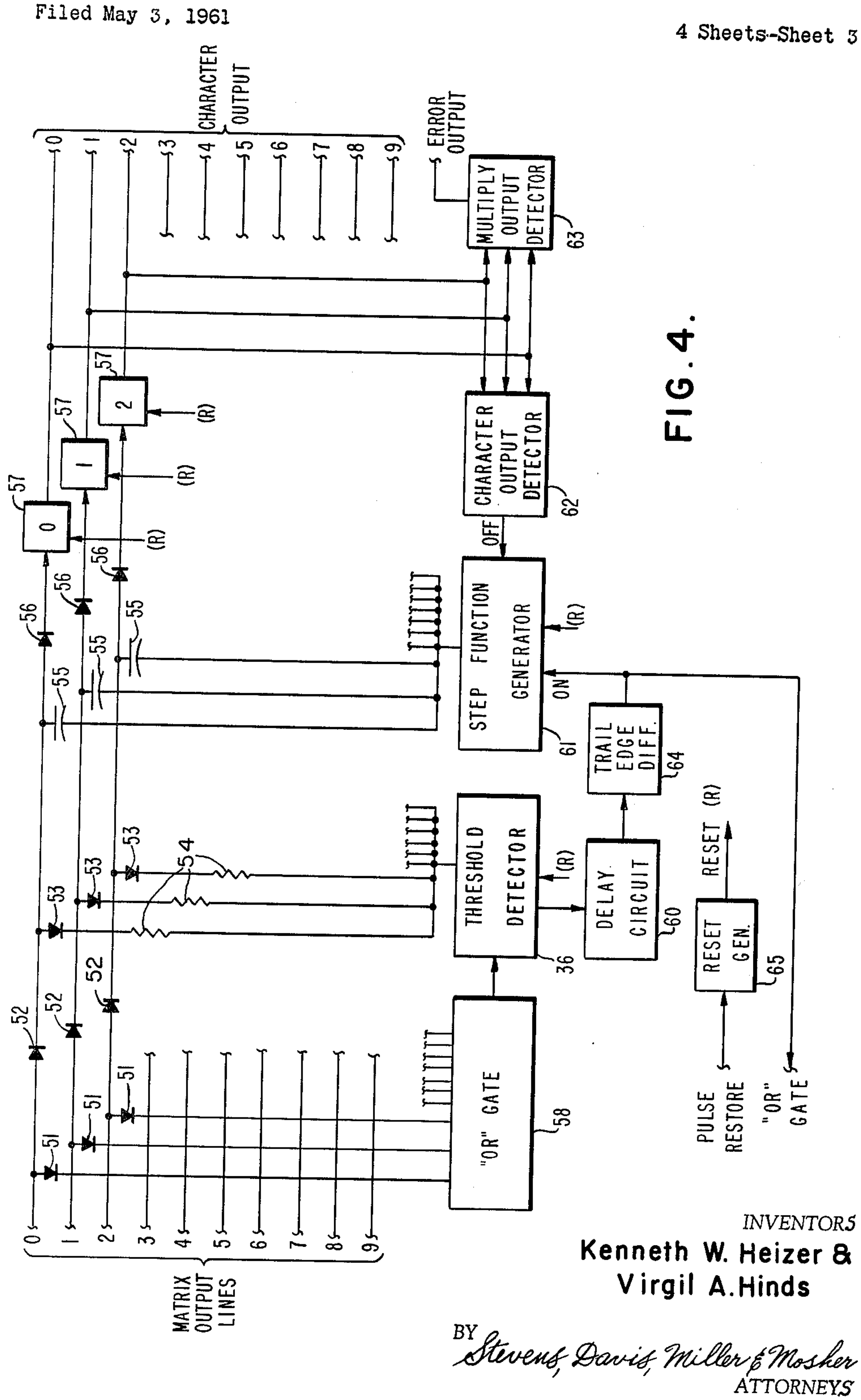
Figure 5:
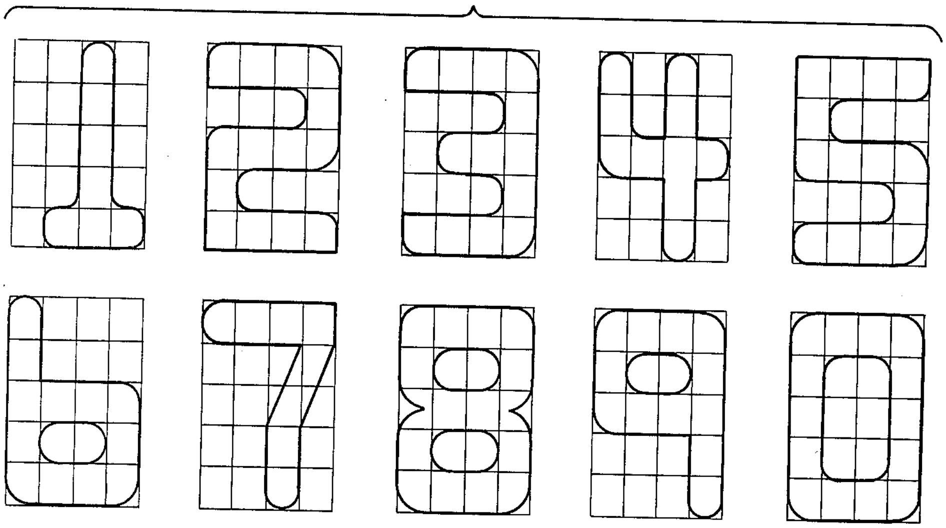
Figure 6:
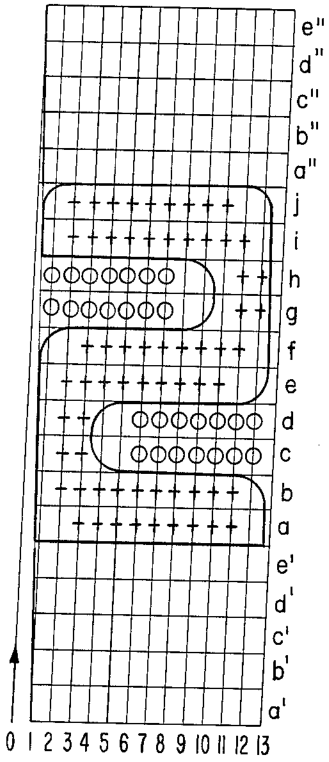
Figure 7:
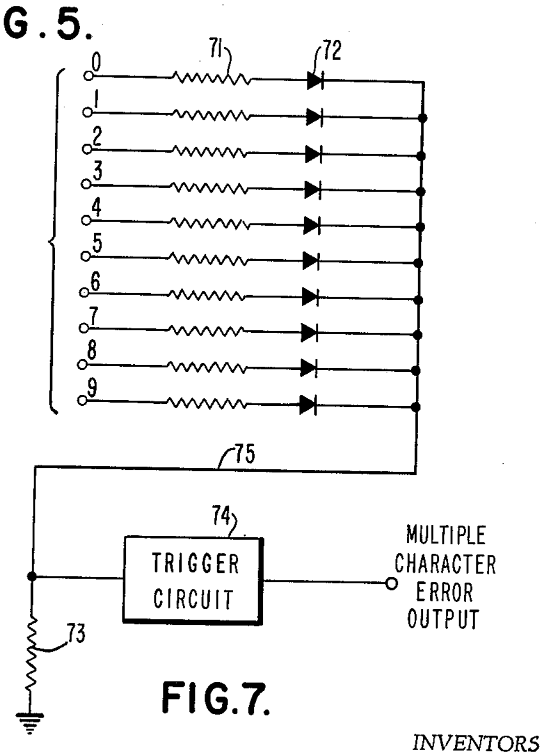

FIGURE 3 is a detailed diagram of a segment of the shift register and resistor matrix employed in the invention, FIGURE 4 is a detailed block diagram of the voltage comparing portion of apparatus employing the invention, FIGURE 5 illustrates characters capable of being recognized by apparatus employing the invention, FIGURE 6 demonstrates the manner in which a particular character may be analyzed for setting up the apparatus to read that character, and FIGURE 7 is a diagram of a circuit used as a multiple output error detector.

Figure 1:
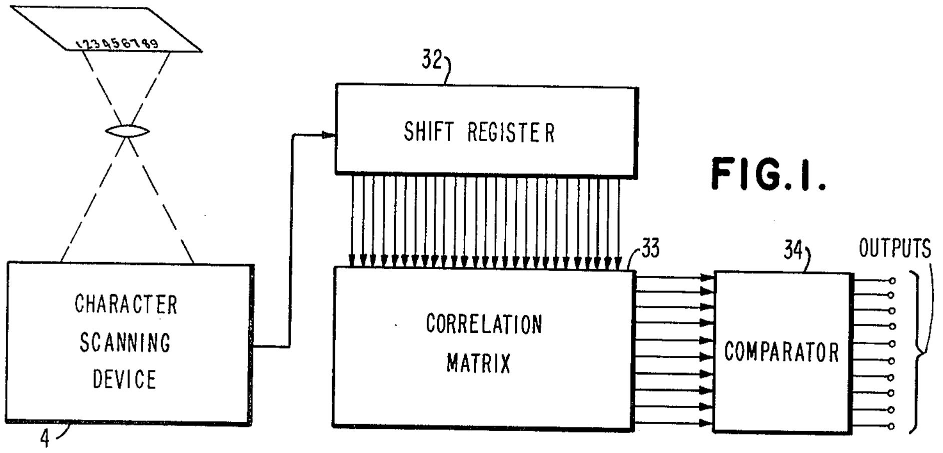
FIGURE 1 is a simplified block diagram of a system employing the invention.

Briefly stated, the invention consists essentially of a Shift Register 32, a Resistor Correlation Matrix 33 and a Voltage Comparator 34, operated in conjunction with a Character Scanning Device 4 as seen in FIGURE 1. The scanner may be of almost any of the types now known in the art, but for purposes of illustration, it will be assumed that scanning apparatus of the type disclosed in the copending application of Kenneth W. Heizer, Serial Number 37,671 and filed June 21, 1960, has been provided.

The Character Scanning Device 4, in scanning a series of characters to be read, produces an output "video" signal consisting of two voltage levels only, indicating respectively the presence of "black" (a portion of a character image) or "white" (background) under the scanning beam at any particular point in time. This video signal, gated by a series of clock pulses, is applied to the input of the Shift Register 32. The shift register is "stepped" or "shifted" by a second series of clock pulses corresponding to the gating or pulsing of the video signal so that the entire train of pulses produced by the scanning of a given character can be sequentially placed into the shift register as it is produced by the scanning device 4.

In parallel connection with the Shift Register 32, is a correlation matrix 33 consisting of input lines from various stages of the shift register and output lines representing each of the characters to be identified by the system. The lines are appropriately interconnected by resistors as will be more fully explained hereinafter. The character output lines of the matrix are applied each to an individual storage capacitor in the Comparator 34. As the string of video pulses representing the particular character scanned passes through the shift register, there will occur at some point a correlation or registration between the said video pulse train and one of what might be called the "stored pulse trains" effected by the particular configuration of the matrix. During the travel of the video pulse train down the shift register, varying output voltages (corresponding to the degree to which the video pulse train matches the various stored pulse trains) will be produced on each of the output lines of the matrix, and, as the storage capacitors in the comparator "remember" the highest voltages applied to them during the passage of the video pulse train, it may be appreciated that the character scanned may be identified by determining upon which of the storage capacitors the highest voltage has been impressed during the passage of the video pulse train since, as will be seen later, the highest output voltage on the output line associated with the stored pulse train most nearly matching the unknown pulse train. When the character scanned has been thus recognized, an output circuit is energized which causes the corresponding character to be recorded in whatever device is connected to the output.

Before considering the invention in greater detail, the particular application for the system which will be illustrated herein as a preferred embodiment should be discussed. It will be assumed that the material to be read occurs in the form of a plurality of multidigit numbers printed on a series of suitable cards, one number per card. A suitable card handling device will be employed to expose the numbers printed on the individual cards to the field of view of the scanning device card by card. A card punching machine will be connected to the output of the character recognition system. Thus, the operation will be to automatically read the number printed on each card and accordingly prepare a punched card containing the same number. Other adaptations of the invention are immediately apparent (preparing punched tapes or duplicate printed cards, reading numerals or digits from sheets of text instead of cards, etc.) and it should be emphasized that the particular application shown in this description is for the purposes of illustration only and should not be construed as limiting the scope of the invention.

The scanning device used should be capable of scanning the line of characters in a plurality of vertical scans progressing laterally down the line of characters. The exact number of vertical scans per character will, of course, be tailored specifically to the reading application intended. Thus a greater or lesser number of vertical scans per character may be made depending upon the particular font or size of type to be read, the anticipated quality of printing and the permissible reject ratio in reading. Experience indicates that between ten and twenty scans will be found appropriate in the majority of cases. The vertical sweep frequency and the horizontal sweep rate should be mutually determined to provide the proper number of vertical sweeps per character in a minimum practical time. In this embodiment a vertical sweep frequency of 5,000 sweeps per second will be employed together with a horizontal sweep rate sufficient to provide twelve vertical sweeps per character. It will be assumed that the characters to be read are one-tenth inch in width.

Figure 2:
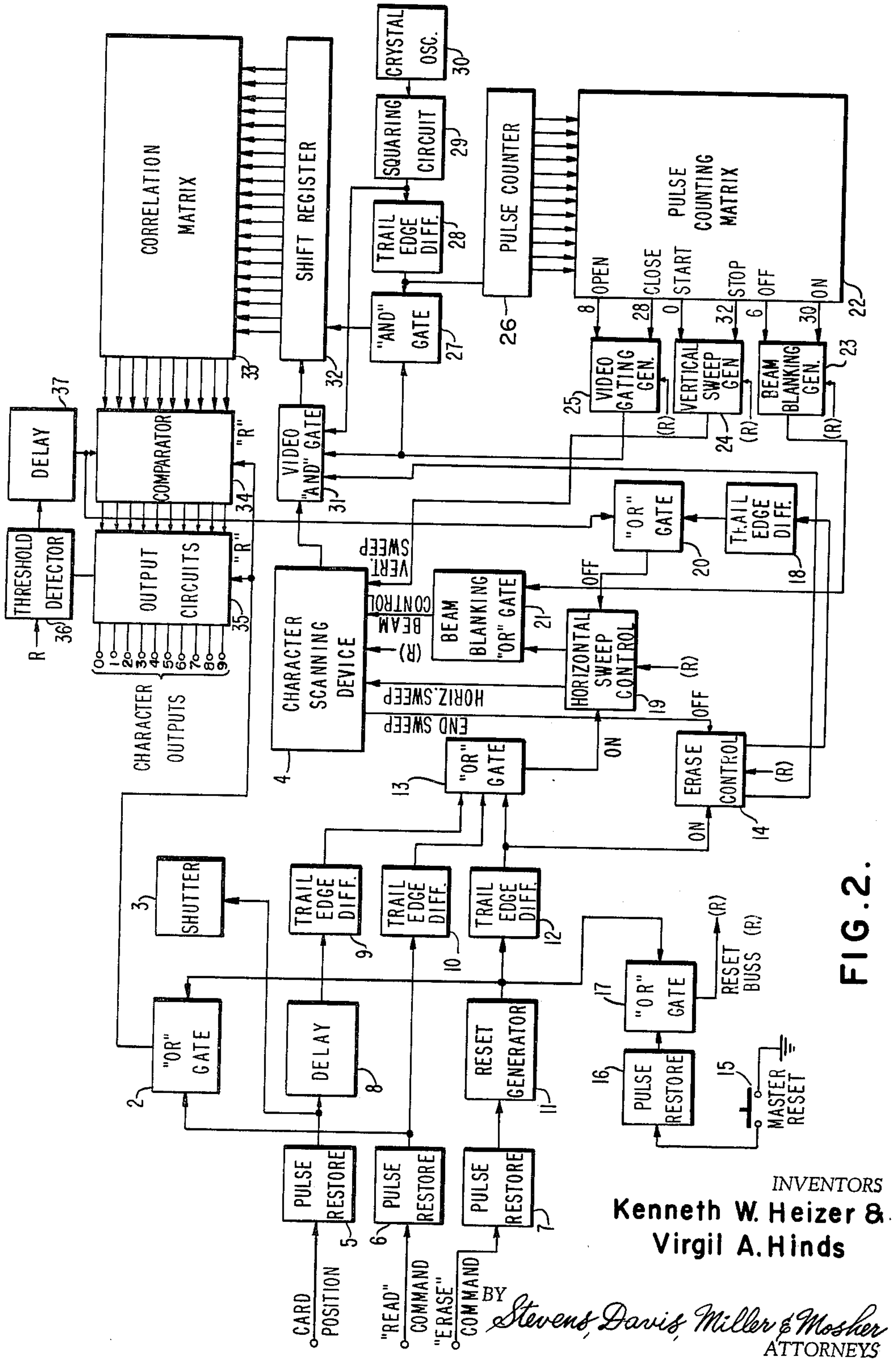
FIGURE 2 is a more detailed block diagram of the system shown in FIGURE 1.

Turning now to the consideration of the invention in detail, it will be seen in FIGURE 2 that the Character Scanning Device 4 is provided with an electrically operated Shutter 3, and a number of control inputs. As was mentioned previously, the scanning device shown in the copending application of Heizer, Serial Number 37,671, filed June 21, 1960, now Patent No. 3,111,647 dated November 19, 1963, is particularly well suited to use here. That scanner makes use of a vidicon tube as a memory and scanning device permitting a group of characters to be sequentially scanned electronically after a single brief exposure of the vidicon to the numerals to be read. Though the present invention will be discussed in connection with this type of scanner, it will be apparent to those skilled in the art that other scanning devices known in the art can be utilized satisfactorily. Control inputs to the scanner are provided for starting and stopping the horizontal sweep, blanking the scanning beam, operating the shutter mechanism, introducing a voltage to be integrated for use as the vertical sweep, and resetting the scanning circuits. The scanner is additionally provided with output lines upon which appear, respectively, the video signals generated by the scanner and a signal indicating the end of each horizontal sweep.

Three main control inputs to the reading apparatus as a whole are also provided. As seen in FIGURE 2, these may be termed "Card Position," "Read Command," and "Erase Command." The input signals to these three lines are often produced by mechanical contacts, and, as a result of the contact "bounce" inherent in relay and other mechanical contacts, it is necessary to provide some means of eliminating the multiple pulses often generated in the closing of these contacts. It is for this reason that a Pulse Restorer 5, 6, 7 is provided in each of the three input control lines. These circuits may be of any of the configurations known in the art for this purpose. However, a Schmitt trigger circuit provided with an input filter capacitor has been found particularly effective.

The CARD POSITION input is used to provide the apparatus with a signal indicating that a card to be read is in position in the card handling device within the field of view of the Scanner 4. This signal is applied to the electrically operated Shutter 3 and to a Delay Circuit 8. Said Delay Circuit is provided to allow time for the shutter mechanism to operate before the CARD POSITION signal is applied to the rest of the system. A one-shot multivibrator circuit may be used to provide the desirable delay. The output of the Delay Circuit 8 is applied to a Trailing Edge Differentiator Circuit 9 which provides a sharp trigger pulse at the end of the output pulse generated by said Delay Circuit 8. This function may be performed by a differentiator circuit which is responsive only to negative going (or positive going, depending on the polarity of the input pulse) signals such as the trailing edge of the one-shot multivibrator pulse. This sharp pulse, denoting the end of the delay period, is applied to one input of an OR Gate 13.

The READ COMMAND input is provided to receive an input pulse indicating that the card punch machine or other output device has "digested" the previous character and is ready to receive another. As indicated previously, this line also is provided with a Pulse Restorer 6 (to eliminate contact bounce), the output of which is applied to one input of OR Gate 2 and to a Trailing Edge Differentiator 10 the output of which is in turn applied to a second input of OR Gate 13.

The ERASE COMMAND input receives an input pulse indicating that the entire number on a card has been read and punched into a tabulating card. It will be seen that this signal originates in the card punch machine when the proper number of digits have been received and punched. The erase signal, after passing through Pulse Restorer 7, is applied to the Reset Generator 11. The output of the Reset Generator, which circuit consists preferably of a one-shot multivibrator of about 100 microseconds time constant, is applied to OR Gate 17, to OR Gate 2 and to a Trailing Edge Differentiator 12. The output pulse of the differentiator is applied to a third input of OR Gate 13 and to the ON input of the Erase Control 14. The output of OR Gate 17 feeds the reset buss. Reset inputs of other circuits in FIGURE 2 which are fed by this reset buss are indicated by an "R" in parenthesis. A second input to OR Gate 17 is fed by a pulse generated in a Pulse Restoring circuit 16 as a result of the momentary closing of a Switch 15 grounding the input of the pulse restoring circuit. This arrangement permits the generation of a reset signal as a result of either receiving an ERASE COMMAND from the output device used with the system or manually momentarily closing the Master Reset Switch 15.

It will be noted that each of the three control input signals is applied to an input of OR Gate 13. The output of this gate is applied to one input of the Horizontal Sweep Control 19, which consists preferably of a flip-flop circuit provided with complementary inputs whereby the circuit may be induced to assume a first state by applying a pulse at one of the inputs and to assume a second state by applying a pulse at the other input. The input which is fed by OR Gate 13 will be termed the ON input here inasmuch as the application of a pulse thereto energizes the horizontal sweep input to the scanner causing the Scanning Device 4 to begin sweeping horizontally. The second output of the Horizontal Sweep Control 19 is applied to one of the two inputs of the Beam Blanking OR Gate 21. When either one of the two inputs of this gate is energized, the scanning beam within the Character Scanning Device 4 is turned off. The OFF input of the Horizontal Sweep Control is controlled by the output of OR Gate 20.

As mentioned previously, the output of Trail Differentiator 12 is applied to the ON input of the Erase Control 14. This circuits is preferably a complementary input flip-flop, the outputs of which are applied respectively to one of the controlling inputs of the Video AND Gate 31 and to a Trailing Edge Differentiator 18. The circuit is so arranged that energizing the ON input of the Erase Control closes AND Gate 31 to the passage of video information from the Scanner. Since Trailing Edge Differentiator 18 is responsive only to a trailing edge of a pulse, no pulse is produced from this circuit upon the turning on of the Erase Control. When the OFF input of the control circuit is energized, the enabling voltage to the Video AND Gate 31 is restored and a pulse is generated by Differentiator 18 which is applied to one input of OR Gate 20. The second input is fed by a pulse originating in the recognition output portion of the system which occurs when a character has been identified.

As previously mentioned, an AND gate is interposed in the video information line connecting the Scanner 4 and the Shift Register 32. As will more fully appear hereinafter, said AND gate performs several gating and blanking operations on the video signals produced by the Scanner. The output of this Video AND Gate 31 is applied to the video input of the Shift Register 32 which, in conjunction with the Correlation Matrix 33, is responsible for the unique character recognition capabilities of the system.

A series of clock pulses, which performs several functions in the control and operation of the system, is generated in an untuned crystal control feedbock Oscillator 30, operating at a frequency of 200 kilocycles per second. The nearly sine wave output of the oscillator is applied to a Squaring Circuit 29 which consists preferably of a Schmitt trigger circuit. The square wave clock pulses thus provided, are fed to the Video AND Gate 31 and to a Trailing Edge Differentiator 28. It may be seen that, assuming signals are present on the other two control inputs of the Video AND Gate 31, the continuous video information applied to the video input of the gate from the Scanner 4 will be converted into a clocked video pulse train by the gating action effected by the application of the square clock pulses to the third control input of the gate. Thus, the video information applied to the video input of the Shift Register 32 is in the form of a train of pulses in which, as referenced to the clock pulses, the presence of a positive pulse represents black video information and the absence of a pulse represents white video information.

The Trailing Edge Differentiator 28 provides at its output pulses which occur at the end of each square clock pulse. These pulses are fed to AND Gate 27 and to the input of the Pulse Counter 26. When AND Gate 27 is "open" the pulses are permitted to pass through to the stepping input of the Shift Register 32.

The Pulse Counter 26 is a conventional six stage electronic counter provided with feedback connections causing the device to count to a scale of 40 rather than 64. The counter must, of course, be capable of operating at a rate of 200,000 pulses per second, the frequency of the clock pulses that are to be counted.

An output lead is taken from each side of each stage in the counter and fed to one of twelve corresponding lines in a Pulse Counting Matrix 22. The matrix is provided to give output signals for the operation of flip-flop circuits at certain counts between zero and forty clock pulses. These flip-flops, the Beam Blanking Generator 23, the Vertical Sweep Generator 24, and the Video Gating Generator 25, are turned on and off at counts of six and thirty, zero and thirty-two, and eight and twenty-eight, respectively. The matrix then, is a simple diode matrix provided with the appropriate diode connections between the twelve input leads and the six output leads to cause said output leads to be energized individually when the Pulse Counter 26 contains counts of 0, 6, 8, 28, 30 and 32.

The output of the Beam Blanking Generator 23 is applied to the second input of the Beam Blanking OR Gate 21. At the thirtieth clock pulse the blanking lead is energized and at the sixth pulse it is de-energized, the net effect being that the scanning beam is on only between counts of 6 and 30 of a 32-count vertical sweep.

The Vertical Sweep Generator 24, the second flip-flop actuated by outputs of the pulse counting system, produces (between pulse counts of 0 and 32 when it is turned on and off respectively) a square wave which is applied to an integrating circuit within the Scanner 4 to produce the sawtooth voltage which, when amplified, is used as the vertical sweep voltage for the scanner.

Connected to the third pair of output leads from the Pulse Counting Matrix 22 is the Video Gating Generator 25, the output of which is connected in turn to the Video AND Gate 31. The effect of this arrangement is to allow video information from the scanner to pass this gate only between counts of 8 and 28 of the 40-pulse cycle of the clock pulse counting circuitry.

As stated previously, the output of the Video AND Gate 31 is applied to the video input of the Shift Register 32. The exact circuitry used in the make up of the shift register is not critical, standard techniques making use of tube or transistor flip-flop elements being quite adequate to provide a satisfactory device. It is only required that the unit provide D.C. voltage level outputs (as opposed to pulse outputs as are usually obtained in magnetic core shift registers) and be so arranged that the vido information pulses and the stepping or clock pulses which advance the patterns of video information down the shift register are received on separate inputs. In the particular embodiment disclosed herein, the shift register must be capable of reliable operation at a frequency of 200 kilocycles per second. The "length" of the shift register, in terms of the number of stages which it contains, is a function of the accuracy of reading of the system which is demanded and the nature of the characters to be read. It may be appreciated that, inasmuch as each character is identified by detecting the printed or unprinted condition of the character in a plurality of incremental sampling areas, the accuracy of the system as a whole may be increased, up to a point, by increasing the number of Sampling areas. However, as the resolution of the system as a whole is increased, a corresponding increase in the size of the shift register must be made, thus placing a practical limit on the number of sampling areas that may be used. Experience has shown that the presence or absence of a vertically disposed portion of a character may be reliably detected in two vertical sweeps. Horizontally disposed elements may be similarly detected by two divisions of a vertical scan. It may be seen that the numerals shown in FIGURE 5, which will be used as examples of characters which may be read by the invention, lend themselves naturally to a division of four units horizontally and five vertically. As there are four horizontal divisions, the scanner should provide at least eight vertical scans per character, if each horizontal division is to be accurately read in itself. In this particular example, three scans per division will be made to provide greater resolution as a margin of safety. Thus in the instant case, twelve vertical scans per character will be used.

Since the characters fall naturally into a vertical division of five units, ten vertical divisions will be employed in character recognition. In addition, an area corresponding to half of a character height above and below the anticipated area of the line of characters to be read will be scanned to permit the reading of numerals displaced vertically on the card. Thus, the reading of each character will involve the examination of 240 sampling areas, twenty vertical units in each of twelve vertical scans.

It should be understood that the principles disclosed above are equally applicable to the development of apparatus for the reading of characters which are not susceptible to such systematic division, the particular characters of FIGURE 5 being shown only for the sake of easily setting forth the steps used in analyzing characters to be recognized.

Proceeding now to the pulse train interpreting portion of the system, it is seen, as in FIGURE 3, that the individual outputs of various stages of the shift register are applied to respective lines in the Correlation Matrix 33. As there are 240 stages in the shift register, there will be 480 usable outputs for each of which a line is ordinarily provided in the matrix. We have assumed that there are ten different characters to be recognized (the numerals 0 through 9 of FIGURE 5) so there will be ten horizontal matrix lines. The matrix need not be quite this large, however, inasmuch as the sampling areas provided above and below the anticipated line of characters produce only spaces in the video pulse train. The pulses representing a single vertical scan cannot exceed ten units in length even when the character scanned is vertically displaced, said vertical displacement affecting only the number of blank areas occurring at the beginning of the video pulse train. Therefore, the matrix need consist of only ten horizontal character output lines and 240 vertical shift register output lines (the 240 being derived from 12 vertical scans times ten active vertical sampling areas times two outputs from each corresponding shift register stage).

FIGURE 3 shows a five unit segment of the shift register together with the corresponding section of the correlation matrix. Each of the five shift register elements 41–45 is divided for clarity into two halves labeled "black" and "white" respectively. It will be assumed that when the video pulse train has placed a stage into the condition corresponding to the presence of printing in a sampling area of a character that the output line from the black half of the element will be energized, and, conversely, when a "no printing" bit is present in the stage, the white lead will be energized. It will be noted that each horizontal line of the matrix is connected in most cases to either the black or the white shift register element output line depending upon whether a printed or unprinted portion of the character represented by that particular horizontal line is expected to occur at the particular sampling area corresponding to that particular element of the shift register. Points at which a horizontal character output line is connected to neither the black nor the white side of the shift register element (for example, the line representing the character 2 is connected to neither line at elements 43 and 44) represent areas of the printed character in which, as a result of the particular configuration of the character, there is not a sufficiently high probability of either printing or no printing occurring to justify basing, even in part, the identification of the character on the condition of that particular sampling area.

FIGURE 6 shows an enlarged numeral "2" over which has been traced a grid corresponding to the sampling area divisions as well as another series of twelve lines corresponding to a typical scanning of the character. The scanning beam in this example will be presumed to start at the lower left of the character, sweeping upward in a series of vertical sweeps progressing laterally of the character in a left to right direction.

In beginning the analysis of a character for the preparation of a corresponding matrix, it should be realized that the vertical scanning beam may initially intercept the character at any point between the bottom and top of the numeral. As is seen in FIGURE 6, scan number "0" narrowly misses intercepting the character while scan "1" intercepts the character at the bottom thereof. Since this point of interception is not controlled, sampling areas which would be likely to be affected by horizontal shifts of the scanning raster relative to the character should be avoided. Note however, that this horizontal shift can never amount to more than about half the distance between scans.

The use of sampling areas in portions of the character which are most likely to be imperfectly printed should also be avoided. Such portions would include sharp corners of the character and the ends of strokes making up the character which might at times be not printed when the character impression is made as well as inner boundaries of enclosed unprinted areas in which smudges are likely to occur. Even though the recognition system used here will identify a character scanned as the character which it most nearly resembles in spite of rather significant deviations of the video pulse train from the corresponding stored pulse train, it should be obvious that most satisfactory operation in terms of the smallest number of rejects and errors will be obtained when an effort is made to so construct the recognition circuitry as not to depend on areas of the character in which printing defects are most commonly noted.

Noting the foregoing and referring again to FIGURE 6, it will be seen that matrix connections for the numeral "2" could be made as follows, remembering that the first areas scanned will be represented by the last elements of the shift register-matrix connections inasmuch as the first portions scanned will produce the first pulses introduced to the shift register. The shift register elements will be numbered, beginning at the end opposite the feed point, to correspond to the sampling areas represented by those elements at the time of ideal registration. Thus, the last stage of the shift register will be numbered 1–*a'* to correspond to scan number 1, vertical division *a'*. The next to last stage will be 1–*b'*, etc. each stage being related to the particular scan and vertical division as shown in FIGURE 6.

No matrix connection would be made in stages 1–*a'* through 1–*e'* which represent the vertical character misregistration compensating areas of the scanning raster. No connections would be made in areas 1–*a* through 1–*f* because of the proximity of the edge of the character to these areas, there being a strong likelihood that printing might not occur in these areas in certain instances of imperfect printing. In areas 1–*g* and 1–*h*, connections to the white side of the shift register element would be made since no printing is expected to occur in the character in these areas which are noted by circles in FIGURE 6. No connections are made for areas 1–*i* and 1–*j* because of the likelihood of misprinting at the end of the horizontal stroke forming the top of the character. No connections are made for the rest of the first scan (areas 1–*a''* through 1–*e''*) which represent the upper vertical mis-registration compensating area. On the second scan, no connections are again made in the lower mis-registration compensating area (areas 2–*a'* through 2–*e'*). No connection is made in area 2–*a* because of the strong possibility of the character being not printed in this sharp corner area. Areas 2–*b* through 2–*e* will be recognized by connections to the black side of the corresponding shift register element to require printing to occur in this portion of the character for recognition to occur. Again no connection is made in area 2–*f* because of the possibility of character malformation. Connections are made for a white condition in areas 2–*g* and 2–*h* and, as will appear in FIGURE 6 for 3–*g, h*; 4–*g, h*; 5–*g, h*; 6–*g, h*; and 7–*g, h*. White connections are not made in areas 8–*g* and *h* or 9–*g* and *h* because of white areas such as the open portion of the top of the numeral "2." Following the practices used above, matrix connections for the remaining areas of the numeral "2" as shown in FIGURE 6 as well as for all the numerals of FIGURE 5 can be made easily.

Returning now to the detailed description of the system and referring again to FIGURE 3, it may be seen that each of the horizontal output lines of the Correlation Matrix 33 is applied to the input of a transistor Amplifier 46 of the emitter follower configuration. These amplifiers perform the function of continuously providing an output indication of the degree of correlation between the unknown video pulse train and the stored pulse train represented by the matrix connections of the output line to which the amplifier is attached. This action may best be explained as follows. Assuming that the shift register element output lines swing from ground to a positive voltage as a black pulse enters the element, it may be seen that each one of the entire group of resistors connected at one end to one of the horizontal lines of the matrix will be connected at the other end to either a zero or positive voltage source at any given point in the passage of the video pulse train down the shift register. Whether the connection is to ground or to a positive voltage source depends upon the state of the particular shift register stage to which the connection is made. It will be re-called that connection may be made through a resistor from a horizontal line to either the black or white side of a shift register element depending upon whether a printed or unprinted condition is expected in a sampling area of a character to be read corresponding to the said shift register element. Thus when an ideal pulse train corresponding to a particular character is positioned in the shift register at the point of maximum correlation, each resistor of the horizontal line corresponding to that same character will be connected to a source of positive voltage, thereby raising the entire horizontal line potential to that same positive voltage. In lines corresponding to other characters and in the corresponding line at times other than that of correlation, it will be seen that some of the resistors will be connected to positive voltage points and some will be connected to points at ground potential. The group of resistors connected to a positive potential may be considered as being connected in parallel to a common point and the grounded resistors may be likewise considered as being connected in parallel to point of zero potential. Thus, in effect, the total number of resistors connected to any one horizontal line combine to form a voltage divider between a source of positive potential and ground. The particular voltage at which the line will reside as a result of the voltage dividing action will, of course, depend on the proportionate resistances from the line to the positive source and to ground, which resistances are in turn determined by the respective numbers of parallel elements making up each of the dividing resistances.

As an example of this effect, assume a case in which a particular horizontal line of the matrix is connected through resistors to 80 selected stages of the shift register, and, that of the 80 resistors thus provided, 40 are connected to white output lines of the shift register and 40 are connected to black. Assume further that the shift register output swing is from ground potential to a positive 12 volts. At such times as there is no pulse train in the shift register, all elements of the register will be in the white state and the 40 resistors connected to white shift register output lines will thereby be connected to a positive 12 volts. The 40 resistors connected to black lines are conversely connected to ground potential. Assuming that each resistor has a resistance of 10 thousand ohms, it will be appreciated that a voltage divider will result which consists of two resistive elements of 250 ohms each (10 thousand divided by 40) connected in series between a positive 12 volts and ground, the midpoint being connected to the horizontal matrix line. The voltage present on the line will thus be a positive 6 volts. Assume now that an unknown video pulse train is present in the shift register, said pulse train consisting of an arrangement of black pulses in such position in the shift register that say sixty of the 80 resistors are connected to the positive 12 volts and 20 are connected to ground, that is, a 75% correlation. The voltage divider will now consist of a resistance of about 167 ohms (10 thousand divided by 60) connected to the positive 12 volts and a resistance of 500 ohms to ground from the matrix line. The matrix line will thus be placed at 8 volts $$\left(12v\times\frac{500}{500+167}\right)$$

From these examples it may be appreciated that an indication of the degree of correlation between an unknown pulse train and any of the stored pulse trains represented by the connections on the respective matrix lines at a given time is given by the voltage on said matrix lines as a result of the voltage divider action of the resistors making the connection to the shift register elements. When perfect correlation is reached the matrix line will be placed at a positive voltage equal to the output voltage of the shift register elements.

Referring now to FIGURE 4, which illustrates the comparator and output circuits in greater detail, it may be seen that a separate input line from each of the amplifiers in the Correlation Matrix 33 is provided. Each of these lines is connected through a forward conducting Diode 51 to an OR Gate 58. The output of this OR Gate is applied to a Threshold Detector 36 which consists of a flip-flop circuit provided with an input arrangement such that the circuit will be "flipped" when a pulse of a predetermined "threshold" magnitude or greater is applied. A Schmitt trigger circuit feeding a flip-flop would provide the desired action. It is preferable to provide means for varying the "threshold" to which the detector circuit will respond.

One output of the Threshold Detector 36 is applied to a Delay Circuit 60 which consists preferably of a one-shot multivibrator of about 1.4 milliseconds time constant, corresponding in time to about seven vertical sweeps of the scanner. The output of said Delay Circuit is fed to a Differentiating Circuit 64 adapted to provide a sharp output pulse at the end of the delay period generated by said delay circuit.

The output of the Differentiating Circuit 64, in addition to initiating the action of the Step Function Generator 61 as will be shown later, also halts the scanning process of the character image by returning the Horizontal Sweep Control 19 to the OFF condition. To this end, an output of said delay circuit is applied to one of the two inputs of OR Gate 20, the output of which, as explained above, is connected to the OFF input of the horizontal sweep control.

An additional output of the Threshold Detector 36 is connected through a plurality of lines provided with series Resistors 54 and reverse connected Diodes 53 to the separate character lines. Forward connected Diodes 52 are interposed in said lines between the points at which connections are made respectively to the OR Gate 58 and the said Threshold Detector 36. It should be noted that the Threshold Detector outputs are maintained at approximately ground potential until, as will be more fully explained hereafter, a threshold matrix output condition is detected at which time the said Threshold Detector outputs swing to a positive value.

Also connected to each of the character lines is one side of a Storage Capacitor 55. The opposite side of each of these capacitors is connected in common to the output of a Step Function Generator 61. Capacitors of the disc ceramic type having a capacity of about .01 microfarad may be used.

The Step Function Generator 61 may be of any of several forms known in the art. As stated previously, the output of the circuit should remain at ground potential until the circuit is triggered by the delayed output of the Delay Circuit 60. The output voltage of the circuit should then proceed to rise in a series of steps at a rate of about 50 thousand steps per second in increments of the order of .2 to .5 volt. In the embodiment disclosed herein, the circuit should be capable of producing 20 to 50 such steps per cycle in reaching a maximum output of about 10 volts. This "stairstep" output may be produced by providing an integrator circuit at the output of a free running multivibrator. A particularly convenient means of obtaining the desired output in the system described herein would be to make use of the clock pulses provided by the output of the Crystal Oscillator and Squaring Circuit 29, thus eliminating the above mentioned multivibrator. To obtain the desired 50 kc. frequency, it would be necessary, however, to divide the 200 kc. pulses of the clock by a factor of four, an operation that is conveniently performed by the first two stages of the Pulse Counter Circuit 26. The second stage of said counter provides an output in response to every fourth input clock pulse and it may be appreciated that the desired step function could be obtained by applying an output of the said counter stage to an integrating circuit.

Proceeding, it is seen that each of the character lines is fed, through a forward connected Diode 56, to the input of an Output Circuit 57. These output circuits may consist of any of several of the bistable devices known in the art, such as flip-flop circuits, thyratrons, electronic relays, etc. The device chosen will, of course, depend to some extent on the nature of the apparatus which is to be actuated by the output of the character recognition system.

For most purposes flip-flop circuits will be found satisfactory. The outputs of the Output Circuits 57 constitute, obviously, the character outputs of the system. It will be noted that a Character Output Detector 62 is provided, the inputs of which are connected to the character output lines. The output of this circuit, which consists of an ordinary OR gate to provide an indication that some character has been recognized by the system, is fed to the OFF input of the Step Function Generator 61 to prevent any further increase in the voltage of the circuit.

A line from each character output is also fed to a Multiple Output Detector 63 which provides an output pulse to the card punching machine whenever more than a single character output line is energized at any one time. This function can be effectively performed by a Schmitt trigger circuit provided with a resistor-diode input circuit as shown in FIGURE 7. As is seen in the diagram, an output from the normally ground potential side of each of the Output Circuits is provided with a series resistor 71 of say 10 thousand ohms and a forward conducting diode 72. These lines are applied in common to the input of the Schmitt trigger circuit 74 which is so arranged as to cause the circuit to trigger when the input line 75 is raised above say 7 volts. An input resistor 73 of about 10 thousand ohms is provided to complete the voltage divider input. It may be seen that when none of the Output Circuits is energized, all of the inputs to the voltage divider will be at ground potential. The Schmitt trigger input 75 will also be at ground and the circuit will not be triggered. When one of the output circuits is energized, one of the inputs to the voltage divider will be raised to a positive 12 volts. Current will then flow from the 12-volt source, through the resistor 71 and forward conducting diode 72, and through the resistor 73 to ground. Current will not flow in the non-energized input lines because of the diodes 72 which are non-conducting in this direction. Thus, a voltage divider consisting of two 10 thousand ohm resistors is formed and the input voltage to the Schmitt trigger circuit will be approximately 6 volts which is not enough to fire the circuit. When two of the voltage divider input lines are raised to a positive volt, the voltage divider will consist of 5 thousand ohms in the upper leg (the two 10-thousand ohm input resistors in parallel) and 10 thousand ohms in the lower leg, which will result in an input voltage to the trigger circuit of about 8 volts which will trigger the circuit. If still more of the output circuits are energized, the input voltage to the trigger will be still higher. It is apparent that the circuit will not be triggered when only one output circuit is energized and will be triggered when two or more are energized and thus effectively serves as an indication of the occurrence of multiple outputs from the system. The output of the circuit is fed to the card punch machine or other output device as an error signal, indicating that whatever character output signals are present should be considered as invalid and that the card being punched should be error punched or the system be halted for manual reading and punching of the card.

An input line to the comparator section of the apparatus from the READ COMMAND line is provided to trigger the resetting of the comparator circuits after each character is read. As seen in FIGURE 4, this signal is applied to a Reset Generator 65 which consists of a one-shot multivibrator circuit with a short time constant. The reset signal generated by this circuit is applied to the Threshold Detector, the Step Function Generator, and to each of the ten Output Circuits to reset them to the "ready" state after each character has been accepted by the card punch or other output device.

Referring again to FIGURE 2 and describing the operation of the system in recognizing characters, it will be assumed that a card punching machine is connected to the character output of the system. Assuming that the system is being initially placed into operation after having had the power turned off for a period, the first step in returning the system to service after the power is applied to the circuits is to momentarily close the Master Reset Switch 15 generating a pulse which is applied to the reset buss through OR Gate 17 thus placing the system in a state of readiness for the reading of the first character bearing card. As explained earlier, circuits operated by the reset buss are shown with a reset input designated by an "R" in parentheses. The reset pulse so generated is additionally applied to an input of OR Gate 2, as explained previously, the output of which is applied to the Reset Generator 65 of FIGURE 4 thus resetting the circuits of the comparator section of the system to a state of readiness for the reading of the first character.

When the system has been so reset, the card handling device would be manually operated to bring the first card into position to be read. The operation of the card handling device in positioning the card produces a pulse on the line connected to the Card Position input to the system which leads directly to a Pulse Restorer 5. The sharp output pulse of this circuit operates the Shutter 3 (exposing the card to the field of view of the Scanning Device 4, thus recording the image of the characters to be read) and triggers the Delay Circuit 8. At the end of the time delay (introduced to allow the shutter time to operate), the pulse produced by the Trailing Edge Differentiator 9, passing through OR Gate 13, places the Horizontal Sweep Control 19 in the ON condition thus initiating a horizontal sweep within the scanner and, through OR Gate 21, removing the blanking voltage from the scanning beam of the scanner.

The clock pulse generator, comprising the Crystal Oscillator 30 and a Pulse Squaring Circuit 29, is in constant operation. The square clock pulses are applied to one of the inputs of the Video AND Gate 31 and to a Trailing Edge Differentiator 28 which produces a corresponding register shifting pulse at the end of each clock pulse that is applied to the input of the Pulse Counter 26 and to one input of AND Gate 27. As explained previously, the pulse counter together with the associated Pulse Counting Matrix 22 and the Video Gating Generator 25, Vertical Sweep Generator 24, and Beam Blanking Generator 23 provide recurring control voltages for the scanner and video AND gate. Thus, in any cycle, begining at clock pulse 0, the Vertical Sweep Generator 24 is turned to the ON state which produces the voltage which is integrated in the scanning circuitry to generate the vertical sweep voltage thereby initiating a vertical sweep of the scanning beam. At the count of clock pulse "6" the Beam Blanking Generator 23 is placed in the OFF state, thus turning on the scanning beam. At the count of "8" the Video Gating Generator 25 is switched to a state which opens the Video AND Gate 31 subject, of course, to the control of the third gate input which is fed by the square clock pulses.

The video AND gate remains open until a pulse count of "28" has been reached. This period of twenty pulses is the only portion of the vertical sweep during which video information may be fed into the shift register and each of the twenty pulses may then be seen to correspond to one of the vertical sampling areas into which the character areas to be examined have been divided as illustrated in FIGURE 6.

When the pulse count has reached "30," the Beam Blanking Generator 23 is returned to the ON condition which re-applies the beam blanking voltage to the scanner through OR Gate 21. At the count of "32" the Vertical Sweep Generator 24 is returned to the reset condition ending the vertical sweep and initiating the vertical retrace within the scanner. The time elapsing between the count of "32" and "40" (the point at which the pulse counting circuitry begins a new sweep cycle) is provided for the purpose of allowing the completion of the horizontal sweep retrace and insuring that other circuits associated with the vertical sweep cycle will be stabilized before the next vertical sweep begins.

As has just been explained, it is only between clock pulse counts of "6" and "30" that video information is generated by the scanning beam in traversing the image of the character bearing area and applied to the video AND gate since at other times the scaning beam is blanked. However, to eliminate the possibility of "reading" the transients created by the turning on of the scanning beam, the video AND gate is not opened until a count of "8," two counts later than the point at which the scanning beam is unblanked. The square clock pulses applied to the third input of the video AND gate form the video information into a series of video pulses which are applied sequentially to the input stage of the Shift Register 32. At the end of each clock pulse, a sharp pulse from the Trailing Edge Differentiator 28 is applied to the stepping input of the shift register through AND gate 27 which is held open between clock pulse counts of "8" and "28" by a voltage from the Video Gating Generator 25. Thus, the video pulses are applied to the first stage of the shift register, setting it to a black or white condition, and then sequentially stepped down the register as stepping pulses are applied to the stepping input. It should be recalled that a white pulse in the system herein disclosed is not a pulse at all, but rather the absence of a black pulse at a particular time at which a clock pulse has been applied to the clock input of the video AND gate. The scanning device is so arranged as to include within its field of view an area somewhat larger in the horizontal dimension than the anticipated group of characters to be read so that horizontal displacement of the characters on the card by amounts of up to two or three character widths will not affect the reading of the characters. For this reason, the horizontal sweep begins at the extreme edge of the field of view as recorded on the vidicon as it proceeds across the tube in a series of vertical sweeps. Except for extraneous marks, smudges, etc., no printing is ordinarily present in the area of the card corresponding to the area of the tube scanned in the first few character widths and, hence, no video information is ordinarily generated, noise produced by marks, smudges, etc., excepted.

Thus the scanning beam moves across the scanning area, producing only occasional noise pulses, until the first character is reached. As the scanning beam moves over the character image, the scanner produces an output signal in which a first voltage level indicates the scanning of printed portions of the character and a second level indicates the scanning of unprinted portions of the character. This continuous signal is formed into pulses in the Video AND Gate 27 and is applied to the video input of the shift register. The video pulses applied to the shift register are each momentarily stored in the input stage of the register and then shifted down into the register as a clock pulse is applied to the stepping input of the register. At any given moment the shift register is seen to contain a single pulse in its first stage indicating the black or white condition of the character image in the particular area being scanned at that moment as well as a series of pulses indicating the condition of the areas of the image previously scanned. It may be seen then that the complete video pulse train for a character so scanned will consist of twelve groups of pulses (one group for each vertical scan of the character) of ten pulses each (one pulse for each clock pulse occurring during each vertical scan of an actual character), the groups being separated by spaces of ten pulses as a result of the vertically scanned areas above and below the characters provided to enable the reading of vertically misaligned characters.

It should be noted here that characters which occur within the field of view of the scanner in a vertically displaced position may be read by the system without difficulty just as though they were perfectly positioned. This follows from the fact that the pulse train developed by the scanning of a displaced character varies from the pulse train of a perfectly positioned character only in the number of white pulses occurring before the beginning of video information. Thus, in an upwardly displaced character, a few more white pulses will precede the video pulse train produced by scanning the character since the scanning beam must travel upwardly for a short distance before the character is intercepted. In downwardly displaced characters, a few less pulses will precede the pulse train for the same reason. It may be appreciated, then, that the Shift Register 32 serves as a registering element that is capable of translating the pulse train developed by scanning a character anywhere within the field of view of the scanner to the point of closest registration with the stored pulse trains permitting the pulse train comparison to be made on the basis of ideal registration independent of the actual location of the printed character on the card being read.

As the video pulse train moves down the shift register there will occur, assuming that the character producing the video information is sufficiently well formed to be capable generally of recognition, a point at which there will be a sufficient correlation between the video pulse train and one of the stored pulse trains in the matrix to create an output voltage on one of the character output lines capable of triggering the Threshold Detector 36. It should be understood that the triggering of the detector indicates only that a possibly readable character is present in the shift register and that an attempt should be made to read it. As has been previously stated, the character output level necessary to trigger the detector should be made variable so that an effective balance between cards rejected as unreadable and incorrectly read cards may be obtained in keeping with the particular application in which the apparatus is utilized. It should be apparent that if the threshold level is set too low, the apparatus will attempt to read characters so smudged, broken or otherwise imperfect that the probability of mistaking the character for another will be so high as to produce an intolerable number of errors. On the other hand, if the level is set too high, the apparatus will pass over without attempting to read characters that, though perhaps slightly imperfect in formation, are well within the reliable reading capabilities of the system.

Referring particularly to FIGURE 4, it will be observed that each of the matrix amplifier output lines continues as a separate channel through Diodes 52 and 56 to an Output Circuit 57 the output of which provides the character output of the apparatus. A threshold monitoring line is taken off each character line through Diode 51, fed through OR Gate 58 and applied to the input of the Threshold Detector 36, the effect of which is to trigger the detector circuit whenever the voltage level on any one of the matrix output lines rises to the preset threshold level.

As described previously, the triggering of the Threshold Detector 36, not only initiates the action of the Delay Circuit 60 and Step Function Generator 61, but also raises the terminal voltage of the storage capacitor discharge lines which are taken off each character line through a Diode 53 and a Resistor 54 and applied to an output of the detector. During the time after some video information has entered the shift register but before a threshold voltage has been developed, whatever voltage is present on each matrix output line will also be placed on the corresponding storage capacitor. The matrix output voltages vary continuously as varying degrees of correlation occur between the pulse train in the register and the stored pulse trains of the matrix and, as a result of the discharge path offered by the forward biased Diodes 53 and series Resistors 54, the voltages on the storage capacitors 55 follow these varying matrix output voltages. However, when the threshold detector is triggered, raising the terminal voltage of the capacitor discharge lines to a positive value which is somewhat higher than the highest voltage the matrix output lines can attain, the discharge paths for the storage capacitors are removed and the capacitors then retain the peak voltages impressed upon them by the matrix output lines. The voltages impressed upon the capacitors in this manner are retained inasmuch as current can flow neither back into the matrix line because of the reverse biased Diodes 52, nor through the normal discharge path of the Diodes 53 and Resistors 54 since the termination of these lines is now at a higher potential than the capacitors, nor on through the diodes 56 to the inputs of the Output Circuits 57 inasmuch as these inputs are biased to a positive potential equaling the highest voltage attainable by the matrix output lines.

At the end of the delay period introduced by the triggering of the Delay Circuit 60 by the Threshold Detector 36, a triggering pulse is applied to the Step Function Generator 61 by the Trailing Edge Differentiator 65. This same pulse is also fed back through OR Gate 20 to the OFF input of the Horizontal Sweep Control 19 to halt the horizontal sweep of the scanning beam until the beginning of the reading of the next character. The length of the delay introduced should be slightly longer than the time required for the completion of the scanning of a character image after the first possible occurrence of a threshold voltage being developed on a matrix output line. In the system disclosed herein, the threshold would be adjusted to occur in the neighborhood of the seventh or eighth sweep of the scanning beam, and as the beam makes about twelve sweeps in scanning the average character, it may be seen that the delay should be long enough for approximately ten additional sweeps to be made after the occurrence of threshold to insure that the character has been fully scanned before the sweep is halted. At a sweep rate of 5,000 cycles per second this time will amount to two milliseconds.

As the Step Function Generator 61 begins its action of raising the previously ground potential side of the storage capacitor (capacitors) to a positive voltage in a series of steps, it may be appreciated that the side of the capacitors connected to the matrix lines will also rise in identical voltage steps. The voltage on any storage capacitor at any given time will be equal to the sum of the voltage placed on the capacitor as a result of pulse train correlation in the matrix and the voltage by which the bottom of the capacitor has been raised from ground. The Output Circuits 57 are so arranged that they may be triggered only by positive pulses. Additionally, the inputs are biased to a positive potential equal to the matrix output voltage occurring at 100% correlation (which has been shown to be plus 12 volts in this example). The effect of this is to cause the output circuit associated with the matrix line and storage capacitor upon which has appeared the highest voltage during the storage period to be the first output circuit to be triggered as the step function generator raises the common terminals of the storage capacitors in a series of voltage increments.

It may be appreciated that in a case where near 100% correlation has occurred in the matrix, thus placing the voltage stored on the corresponding storage capacitor, at 12 volts, the output circuit associated with that matrix line and storage capacitor will be triggered at the very first positive voltage step produced by the step function generator inasmuch as said output circuits are responsive to the first positive pulse occurring after the Diodes 56 become forward biased. In any case, it is the output circuit associated with the storage capacitor upon which the highest voltage has been impressed during the storage period which will be triggered first after the step voltage is applied since the voltage differences appearing on the sides of the capacitors connected to the matrix lines are maintained as the common sides of the capacitors are raised together in voltage steps.

When one of the output circuits is triggered, the corresponding character output line is energized. In FIGURE 4 it may be seen that connections are made from each of the character output lines to a Character Output Detector 62 which consists of an OR gate feeding a Schmitt trigger circuit. The triggering of the detector halts the step function generator. It may be appreciated that if such provision were not made, each of the output circuits would be triggered as the step function generator continued to raise the storage capacitor voltage associated with each matrix line to the point of forward biasing the Diode 56 feeding the input of the corresponding output circuit.

The Multiple Output Detector 63, as explained previously, creates an error signal when more than a signal output circuit is energized at any one time. It may be seen that multiple outputs could occur when two or more storage capacitors are impressed with very close to the same voltage (indicating approximately the same degree of correlation existing between the video pulse train and two or more of the stored pulse trains) thus causing the associated output circuits to be triggered on the same step in the step function generator cycle. When the character is so poorly printed as to create such a lack of discrimination in correlation, it is actually desirable to have the error circuit energized by multiple outputs inasmuch as the chance for error in recognition is very high in such poorly correlated pulse trains.

Assuming that a multiple output has not occurred, the energizing of any of the Output Circuits 57 will cause the corresponding character to be punched into a card by the card punch machine connected to the output of the system. The punching of this first digit produces a signal indicating that the punch is prepared for the next digit, said signal being applied to the READ COMMAND input of the reading circuitry shown in FIGURE 2. The effect of this signal is to return the Horizontal Sweep Control 19 to the ON condition thus restarting the horizontal scan and initiating the reading of the next character image stored in the scanning circuitry. This signal is also applied to the Reset Generator of the comparator circuits (as seen in FIGURE 4) thereby returning said circuits to a "ready" state to begin the recognition of the next character. The reading-punching cycle continues character by character until all the characters on the card have been read and punched.

When the reading of the first card is complete, an ERASE command is applied to the appropriate input of the reading circuitry which in turn provides a reset signal for the system and initiates the erasing of the image retained in the scanner. During the scanning cycle which erases this retained image, the Video AND Gate 31 is closed to the passage of video information by the input to said gate from one output of the Erase Control 14. Upon completion of the erase sweep, a signal is fed from the scanner to the OFF input of the Erase Control which places the system in condition for the reading of the next card. When the second card is in position to be read, a signal is applied again to the Card Position input of the apparatus thus initiating a repetition of the reading and erasing cycle just described. The procedure is repeated card by card until all cards in the card handling machine have been processed.

In summary then, the present invention provides a system of character recognition in which the discrete areas of the character are scanned seriatim to generate a multibit digital signal, one bit per discrete area. This digital signal is then stored in a storage means such as a shift register, bit by bit as they are generated. This coded signal generated by the scan may, for convenience, be identified as the first coded signal. Means are provided for periodically decoding the contents of the shift register. This latter mentioned means includes a decoder, preferably in the form of a resistance matrix having different resistance configurations for each of the known characters. Each configuration essentially forms an individual decoder for each of the known characters and effectively stores a plurality of second coded signals each characteristic of a different known character. As the shift register content is periodically decoded, preferably once each bit time, each of the resistance configurations provides an output signal in the form of an analog voltage level. The voltage level resulting from each configuration is a function of the degree of identity between the digital signal content of the shift register and that content necessary to identify each of the known characters. This degree of identity may be called the percentage of correlation. The individual analog output voltage levels of each resistance configuration is continually stored by an individual storage means associated with each of the outputs, said storage means taking the form in the present instance of a condenser. Prior to the attainment by any of the output voltage levels of a so-called threshold level, these condensers substantially follow the output voltage levels generated by the decoder. Once, however, a significant percentage correlation is reached, at which time one of the output levels reaches the threshold level, two major factors comes into play. First of all, the condensers no longer are able to discharge and consequently can only increase in voltage. This is essentially due to the fact that a threshold detector is activated to cut-off the discharge paths of all of the storage condensers. Secondly, a step function generator is activated. It is the function of this generator to generate a step wave voltage which is applied in parallel to each of the storage condensers. This generator applies this step wave voltage with increasing steps once each bit time. Associated with each storage condenser is a bistable device having a critical bias applied thereto. The voltage on each of the storage condensers is applied to the input to its associated bistable device. Once the voltage on the condensor exceeds the critical bias, the bistable device is triggered to its opposite state. That bistable device associated with the condenser having the highest voltage and consequently the highest degree of correlation will be the first bistable device to be so triggered. Thereby the scanned character is identified.

While one embodiment of the present invention has been described, other embodiments obvious to those skilled in the art from the teachings herein are contemplated to be within the spirit and scope of the accompanying claims.

What is claimed is:

1. A system for character recognition comprising means to scan a character to be recognized to provide an identifying digital signal in a shift register, a decoder associated with each known character, means to feed the content of said shift register to each of said decoders whereby each decoder produces an analog output therefrom which is a function of the degree of identity between the contents of the shift register and the character with which the decoder is associated, individual storage means to store the analog level outputs of each of said decoders, threshold detector means responsive to one of the analog levels exceeding a predetermined level, and means controlled by the threshold detector means for sampling said storage means to select one of the said analog levels having a predetermined relation to the remainder thereof, said selected level identifying the scanned character.

2. A system for character recognition comprising means to scan a character to be recognized to generate a character, a shift register, means to decode the contents of said shift register simultaneously to provide a plurality of output signals, one for each known character, said output signals indicating the degree of identity between the digital signal content of said shift register and the condition thereof indicative of each known character, threshold detector means responsive to one of the output signals exceeding a predetermined level, and means controlled by the threshold detector means for sampling the output signals to select one of said output signals having a predetermined relation to the remainder thereof, said selected output identifying the scanned character.

3. A system as claimed in claim 2 wherein said output signals are in the form of analog voltage levels, said system further including means to establish a threshold voltage level, means to compare said analog voltage levels to said threshold level and means responsive to one of said analog voltage levels exceeding such threshold level to initiate said sampling.

4. A system as claimed in claim 3 further including a storage means associated with each of said output signals to continuously store the analog voltage levels represented thereby.

5. A system for character recognition comprising means to scan a character to be recognized to provide an identifying digital signal, a shift register, means to store said digital signal in said shift register, a decoder associated with each known character, means to feed the content of said shift register to each of said decoders whereby each decoder produces an analog output therefrom which is a function of the degree of identity between the contents of the shift register and the character with which the decoder is associated, individual storage means to store the analog level outputs of each of said decoders, threshold detector means responsive to one of the analog levels exceeding a predetermined level, generator means responsive to the threshold detector means for generating an increasing wave voltage, means to apply the output of said generator to each of said storage means to increase the voltage levels stored and means associated with each of said storage means adapted to indicate the first of said stored voltage levels to reach a critical level thereby identifying said scanned character.

6. A system as claimed in claim 5 wherein said storage means are individual condensers.

7. A system as claimed in claim 5 including individual bistable devices associated with each of said storage means, said devices having a critical biasing level.

8. A character recognition system comprising means for sensing a character to be recognized to produce a plurality of output signals indicating the degree of identity between the sensed character and a plurality of known characters, individual storage means for storing each output signal, threshold detector means responsive to one of the output voltages exceeding a predetermined level, and means controlled by the threshold detector means for sampling the levels of the output voltages to select the output voltage having a predetermined level in relation to the levels of the other output voltages.

9. A character recognition system comprising means for sensing a character to be recognized to produce a plurality of output signals indicating the degree of identity between the sensed character and a plurality of known characters, individual storage capacitors for storing each output signal, threshold detector means responsive to one of the output voltages, exceeding a predetermined level, means controlled by the threshold detector means for sampling the levels of the output voltage to select the output voltage having a predetermined level in relation to the levels of the other output voltages, the last said means including a voltage function generator for generating a wave voltage, means to apply the output of said generator to each of said storage capacitors to increase the voltage level stored thereby, and means associated with each of said storage capacitors adapted to indicate the first of the storage voltage levels to reach a critical level thereby identifying the sensed character.

10. A character recognition system as claimed in claim 9 wherein the output of the function generator is a step wave voltage.

11. A character recognition system comprising means for sensing a character to be recognized to produce a plurality of output signals indicating the degree of identity between the sensed character and a plurality of known characters, individual storage means for storing each output signal, threshold detector means responsive to one of the output voltages exceeding a predetermined level, means controlled by the threshold detector means for sampling the levels of the output voltage to select the output voltage having a predetermined level in relation to the levels of the other output voltages, the last said means including a voltage function generator for generating an increasing wave voltage, the generator being coupled to the threshold detector means by a delay circuit, means to apply the output of said generator to each of said storage means to increase the voltage level stored thereby, means associated with each of said storage means adapted to indicate the first of said stored voltage levels to reach a critical level, thereby identifying the sensed character, and means responsive to the last said means for rendering the function generator inoperative.

12. A character recognition system comprising means for sensing a character to be recognized to produce a plurality of output signals indicating the degree of identity between the sensed character and a plurality of known characters, individual storage means for storing each output signal, threshold detector means for sampling the levels of the output voltage to select the output voltage having a predetermined level in relation to the levels of the other output voltages, the last said means including a voltage function generator for generating a voltage wave in response to a signal from the threshold detector means, and means to apply the output of the function generator to the storage means to increase the voltage level stored thereby, means associated with each of said storage means adapted to indicate the first of said storage means to reach a critical level thereby identifying said scanned character, and means responsive to the last said means for placing the function generator in a quiescent condition, and means responsive to an output from the threshold detector means for increasing the impedance of discharge paths associated with each storage device.

13. A character recognition system comprising means for sensing a character to be recognized to produce a plurality of output signals indicating the degree of identity between the sensed character and a plurality of known characters, individual storage means for storing each output signal, threshold detector means for responsive to one of the output voltages exceeding a predetermined level, means controlled by the threshold detector means for sampling the levels of the output voltage to select the output voltage having a predetermined level in relation to the levels of the other output voltages, the last said means including individual signal responsive circuits coupled to each storage means, and error detecting means coupled to the signal responsive circuits for providing an indication of the simultaneous selection of more than one output voltage.

14. In combination with a reading machine for characters on an area, wherein the machine includes (a) scanning means to examine said area and provide outputs corresponding to the optical density of the subareas of said area, (b) means responsive to said outputs for providing first signals on which to base a character-identity decision, (c) a trigger-actuated comparator to identify the unknown character, and (d) means to conduct first signals to said comparator to enable the comparator to provide a character-identity signal; the improvement comprising (e) means for examining said first signals and for providing a control signal in response to any one of the examined first signals attaining a predetermined analog value, and (f) delay means responsive to said control signal for thereafter triggering said comparator.

References Cited by the Examiner

UNITED STATES PATENTS

| | | | |
|---|---|---|---|
| 2,548,795 | 4/1951 | Houghton. | |
| 2,568,375 | 9/1951 | Toulon | 340—147 |
| 2,813,262 | 11/1957 | Garde et al. | 340—172 X |
| 2,924,711 | 2/1960 | Kretzmer | 340—172 |
| 2,962,704 | 11/1960 | Buser | 340—172 X |
| 2,978,675 | 4/1961 | Highleyman | 340—146.3 |
| 2,988,653 | 6/1961 | Samusenko | 340—174 |
| 2,997,694 | 8/1961 | Thompson | 340—173 |
| 3,103,646 | 9/1963 | Shaeffer | 340—146.3 |
| 3,111,645 | 11/1963 | Milford | 340—146.3 |

MALCOLM A. MORRISON, *Primary Examiner.*

STEPHEN W. CAPELLI, DARYL W. COOK, *Examiners.*